(12) United States Patent
Bearden et al.

(10) Patent No.: US 7,146,467 B2
(45) Date of Patent: Dec. 5, 2006

(54) METHOD OF ADAPTIVE READ CACHE PRE-FETCHING TO INCREASE HOST READ THROUGHPUT

(75) Inventors: Brian S. Bearden, Boise, ID (US);
David K. Umberger, Boise, ID (US);
Guillermo Navarro, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 316 days.

(21) Appl. No.: 10/414,189

(22) Filed: Apr. 14, 2003

(65) Prior Publication Data
US 2004/0205298 A1 Oct. 14, 2004

(51) Int. Cl.
*G06F 12/02* (2006.01)
(52) U.S. Cl. .................. 711/137; 711/118; 711/213; 712/207
(58) Field of Classification Search ............... 711/137, 711/213, 118
See application file for complete search history.

(56) References Cited

U.S. PATENT DOCUMENTS 6,412,046 B1 * 6/2002 Sharma et al. .............. 711/137
6,490,654 B1 * 12/2002 Wickeraad et al. ......... 711/133
6,542,968 B1 * 4/2003 Spencer et al. ............. 711/137

OTHER PUBLICATIONS

Adams, April; "IBM Enterprise Storage Server Models F10/F20"; ZDNet; Jan. 7, 2002; 5 pages; http://techupdate.zdnet.com/techupdate/stories/main/0, 14179,2836789,00.html.
Revel, Dan; McNamee, Dylan; Pu, Calton; Steere, David; Walpole, Johnathan; "Feedback-based Dynamic Proportion Allocation for Disk I/O"; Department of Computer Science and Engineering, Oregon Graduate Institute of Science and Technology; Dec. 7, 2002; 5 pages.
Suh, G. E.; Rudolph, Larry; Devadas, Srinivas; "Dynamic Partitioning of Shared Cache Memory"; Klumer Academic Publisher, Netherlands; 2002; 23 pages.
Grimsrud, Knut Stener; Archibald, James K.; Nelson, Brent E; "Multiple Prefetch Adaptive Disk Caching"; IEEE Transaction on Knowledge and Data Engineering, vol. 5, Feb., 1993; pp. 88-103.
Suh, G. E; Rudolph, Larry; Devadas, Srinivas; "Dynamic Cache Partitioning for Simultaneious Mutithreading Systems"; Proceedings of the IASTED International Conference on Parallel and Distributed Computing and Systems (PDCS2001); Aug. 2001; 7 pages.

* cited by examiner

*Primary Examiner*—Mano Padmanabhan
*Assistant Examiner*—Jasmine Song

(57) ABSTRACT

Exemplary systems, methods, and devices employ receiving an operational parameter characteristic of a storage device, and adapting a read cache pre-fetch depth based in part on the operational parameter. An exemplary device includes a read cache memory and a read cache pre-fetch adaptation module operable to generate an operational parameter and vary read cache pre-fetch depth in response to the operational parameter.

20 Claims, 9 Drawing Sheets

METHOD OF ADAPTIVE READ CACHE PRE-FETCHING TO INCREASE HOST READ THROUGHPUT

CROSS REFERENCE TO RELATED APPLICATIONS

The present application contains subject matter related to the following co-pending applications: Ser. No. 10/414,180, "Method of Cache Collision Avoidance in the Presence of a Periodic Cache Aging Algorithm," Ser. No. 10/414,195, "Method of Detecting Sequential Workloads to Increase Host Read Throughput," Ser. No. 10/414,188, "Method of Adaptive Cache Partitioning to Increase Host I/O Performance, and Ser No. 10/414,194, "Method of Triggering Read Cache Pre-Fetch to Increase Host Read Throughput,". The foregoing applications are incorporated by reference herein, assigned to the same assignee as this application and filed on even date herewith.

TECHNICAL FIELD

The present disclosure relates to data storage, and more particularly, to read cache pre-fetching.

BACKGROUND

Computer data storage devices, such as disk drives and Redundant Array of Independent Disks (RAID), typically use a cache memory in combination with mass storage media (e.g., magnetic tape or disk) to save and retrieve data in response to requests from a host device. Cache memory, often referred to simply as "cache", offers improved performance over implementations without cache. Cache typically includes one or more integrated circuit memory device(s), which provide a very high data rate in comparison to the data rate of non-cache mass storage medium. Due to unit cost and space considerations, cache memory is usually limited to a relatively small fraction of (e.g., 256 kilobytes in a single disk drive) mass storage medium capacity (e.g., 256 Gigabytes). As a result, the limited cache memory should be used as efficiently and effectively as possible.

Cache is typically used to temporarily store data that is the most likely to be requested by a host computer. By read pre-fetching (i.e., retrieving data from the host computer's mass storage media ahead of time) data before the data is requested, data rate may be improved. Data in cache is typically processed on a page basis. Typical storage devices use a fixed cache page size, and the size is typically implementation dependent.

Generally, storage device performance improves as read cache hit rate goes up. Read cache hit rate is a measure of frequency of accessing the read cache rather than the mass media (e.g., a disk). As is generally understood, the mass media typically takes much longer to access than the read cache. Thus, by increasing the read cache hit rate, data input/output (I/O) rate to the host can be increased. In order to take advantage of the relatively faster read cache, typical storage devices attempt to predict what data a host device will request in the near future and have that data available in the cache when the host actually requests it.

In a typical storage device, pre-fetching data involves reading a fixed amount of data from the mass storage media before the data is requested from the host. By way of example, a pre-fetch operation often occurs during a sequential workload. A sequential workload is generally a host workload that includes request(s) for data at logical addresses that are substantially sequential. After detecting a sequential workload, the storage device can pre-fetch data in the detected sequence and store that data in the read cache. If the host continues to request data in the detected sequence, the request data may be available in the read cache, thereby causing a read cache hit.

One problem that may occur is related to read cache capacity. Read cache is necessarily limited. As a result, a typical storage device reuses memory in the read cache repeatedly for pre-fetching operations. A typical storage device selects which data in the read cache to overwrite using a replacement algorithm, such as a least recently used (LRU) algorithm. Unfortunately, situations can arise in which data that is pre-fetched and stored in the read cache overwrites data in the read cache that the host will request. In other words, data that the host will request may reside in the read cache, available to satisfy the request, but because of the limited size of the read cache, that data is overwritten before the host requests the data. The likelihood of this problem occurring typically depends on the size of the read cache, and the amount of data that is pre-fetched. This particular problem can drastically reduce performance because when it occurs, the mass storage components are typically being worked considerably to accommodate pre-fetch operations, and yet the read cache hit rate is not improving or perhaps decreasing.

Another problem that may arise relates to response time of the mass storage components. A particular host workload may request data from the storage device faster than the read cache data can be replenished because of slow response times of the mass storage components. For instance, in a RAID system, the latencies associated with repositioning a disk drive actuator assembly and fetch data from the disk drive may be so slow relative to the rate of incoming host requests, that the data being fetched arrives in the read cache after a host request for the data. Latencies associated with mass storage components can vary depending on age, type, model, and workload. Typical storage device pre-fetch algorithms cannot effectively handle the various workloads and latencies that can arise. Thus, the read cache hit rate may be lower than expected under some situations.

SUMMARY

It is with respect to the foregoing and other considerations, that various exemplary systems, devices and/or methods have been developed and are presented herein.

One exemplary implementation includes a method of receiving an operational parameter characteristic of a storage device, and adapting a read cache pre-fetch depth based in part on the operational parameter.

Another exemplary implementation includes a storage device with a read cache memory and a module operable to generate an operational parameter and vary a read cache pre-fetch depth in response to the operational parameter.

DETAILED DESCRIPTION

Various exemplary systems, devices and methods are described herein, which employ a module(s) for adapting a read cache pre-fetch depth. Read cache pre-fetch depth (or pre-fetch depth) refers to the amount of data to skip ahead in a memory space, such as a host device's memory space. Generally, one or more module(s) employ operations to adapt the read cache pre-fetch depth based on operational parameters. More specifically, an exemplary adaptation operation gathers operational parameters characteristic of a storage device, and increases or decreases the pre-fetch depth in response to variations in the operational parameters. Still more specifically, adaptation may involve generation of operational performance metrics that are used to determine whether to adjust the read cache pre-fetch depth, and if so, by how much.

Figure 1:
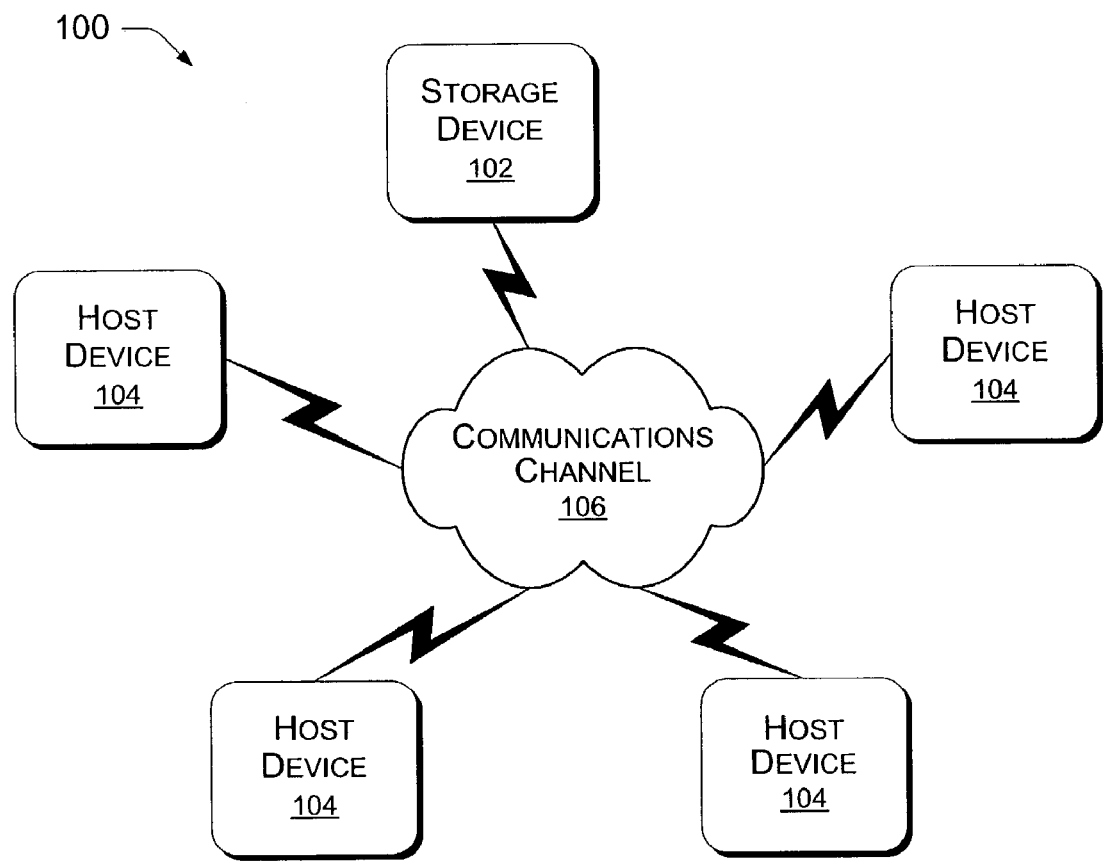
FIG. 1 illustrates a system environment that is suitable for managing cache in a storage device such that cache collisions are minimized.

FIG. 1 illustrates a suitable system environment 100 for adapting a read cache pre-fetch depth based in part on workloads that may arise from one or more host devices 104. The storage device 102 may utilize cache memory in responding to request(s) from the one or more host devices 104. By adapting read cache pre-fetch depth, input/output (I/O) performance of the storage device 102 may improve. Read cache pre-fetch depth refers to an amount of data that is fetched from memory during a read cache pre-fetch operation. As used herein, the terms "read pre-fetch," "read cache pre-fetch," and pre-fetch may be used interchangeably and all refer to a pre-fetch. By pre-fetching data related to a host workload, storage performance goals are more likely achieved than if data is not pre-fetched.

Storage performance goals may include mass storage, low cost per stored megabyte, high input/output performance, and high data availability through redundancy and fault tolerance. The storage device 102 may be an individual storage system, such as a single hard disk drive, or the storage device 102 may be an arrayed storage system having more than one storage system or device. Thus, the storage devices 102 can include one or more storage components or devices operatively coupled within the storage device 102, such as magnetic disk drives, tape drives, optical read/write disk drives, solid state disks and the like.

The system environment 100 of FIG. 1 includes a storage device 102 operatively coupled to one or more host device(s) 104 through a communications channel 106. The communications channel 106 can be wired or wireless and can include, for example, a LAN (local area network), a WAN (wide area network), an intranet, the Internet, an extranet, a fiber optic cable link, a direct connection, or any other suitable communication link. Host device(s) 104 can be implemented as a variety of general purpose computing devices including, for example, a personal computer (PC), a laptop computer, a server, a Web server, and other devices configured to communicate with the storage device 102.

In one implementation, the host 104 transmits requests to the storage device 102 to store and/or retrieve data on and from the storage device 102. One type of request the host 104 may make is a read request to read data from the storage device 102. The read request may indicate an address from which to retrieve data in the storage device 102. In one implementation, the host address is in the form of a logical block address (LBA). The host address may also include a logical unit (LUN), indicating a particular storage unit in the storage device. Other forms of host addresses may be employed.

Whatever the form of the host address, the storage device 102 receives the read request and uses the host address to retrieve the requested data from a mass storage media (such as a disk or tape) or a cache memory. The storage device 102 may parse the read request into various component parts, such as the address and the amount of data requested. In one implementation, the storage device then determines whether the requested data is in the cache memory, and if so, retrieves the requested data from the cache memory; however, if the requested data is not in the cache memory, the storage device 102 retrieves the data from the mass storage media. In a particular disk drive implementation, retrieving the data from the disk(s) involves mapping the given host address (such as LBA/LUN) to another form, such as Physical Cylinder/Head/Sector (PCHS) where the requested data actually resides.

Various exemplary systems and/or methods disclosed herein may apply to various types of storage devices 102 that employ a range of storage components as generally discussed above. In addition, storage devices 102 as disclosed herein may be virtual storage array devices that include a virtual memory storage feature. Thus, the storage devices 102 presently disclosed may provide a layer of address mapping indirection between host 104 addresses and the actual physical addresses where host 104 data is stored within the storage device 102. Address mapping indirection may use pointers or other dereferencing, which make it possible to move data around to different physical locations within the storage device 102 in a way that is transparent to the host 104.

As an example, a host device 104 may store data at host address $H_5$, which the host 104 may assume is pointing to the physical location of sector #56 on disk #2 on the storage device 102. However, the storage device 102 may move the host data to an entirely different physical location (e.g., disk #9, sector #27) within the storage device 102 and update a pointer (i.e., layer of address indirection) so that it always points to the host data. The host 104 may continue accessing the data using the same host address $H_5$, without having to know that the data has actually resides at a different physical location within the storage device 102.

In addition, the storage device 102 may utilize cache memory to facilitate rapid execution of read and write operations. When the host device 104 accesses data using a host address (e.g., $H_5$), the storage device may access the data in cache, rather than on mass storage media (e.g., disk or tape). Thus, the host 104 is not necessarily aware that data read from the storage device 102 may actually come from a read cache or data sent to the storage device 102 may actually be stored temporarily in a write cache. When data is stored temporarily in write cache, the storage device 102 may notify the host device 104 that the data has been saved, and later de-stage, or write the data from the write cache onto mass storage media.

Figure 2:
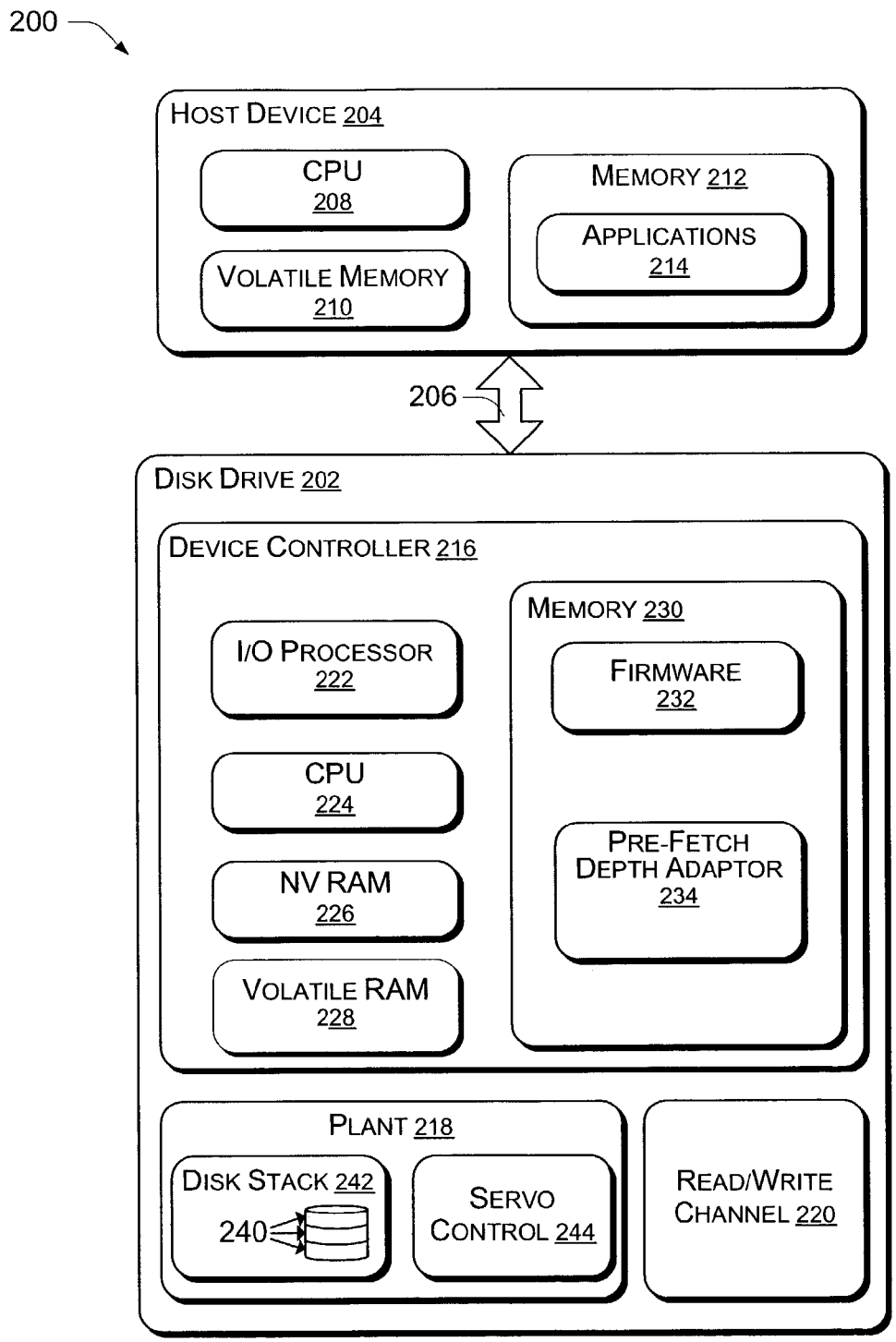
FIG. 2 is a block diagram illustrating in greater detail, a particular implementation of a host computer device and a storage device as might be implemented in the system environment of FIG. 1.

FIG. 2 is a functional block diagram illustrating a particular implementation of a host computer device 204 and a storage device 202 as might be implemented in the system environment 100 of FIG. 1. The storage device 202 of FIG. 2 is embodied as a disk drive. While the methods and systems for adapting read cache pre-fetch depth are discussed in FIG. 2 with respect to a disk drive implementation, it will be understood by one skilled in the art that the methods and systems may be applied to other types of storage devices, such as tape drives, CD-ROM, and others.

The host device 204 is embodied generally as a computer such as a personal computer (PC), a laptop computer, a server, a Web server, or other computer device configured to communicate with the storage device 202. The host device 204 typically includes a processor 208, a volatile memory 210 (i.e., RAM), and a nonvolatile memory 212 (e.g., ROM, hard disk, floppy disk, CD-ROM, etc.). Nonvolatile memory 212 generally provides storage of computer readable instructions, data structures, program modules and other data for the host device 204. The host device 204 may implement various application programs 214 stored in memory 212 and executed on the processor 208 that create or otherwise access data to be transferred via a communications channel 206 to the disk drive 202 for storage and subsequent retrieval.

Such applications 214 might include software programs implementing, for example, word processors, spread sheets, browsers, multimedia players, illustrators, computer-aided design tools and the like. Thus, host device 204 provides a regular flow of data I/O requests to be serviced by the disk drive 202. The communications channel 206 may be any bus structure/protocol operable to support communications between a computer and a disk drive, including, Small Computer System Interface (SCSI), Extended Industry Standard Architecture (EISA), Peripheral Component Interconnect (PCI), Attachment Packet Interface (ATAPI), and the like.

The disk drive 202 is generally designed to provide data storage and data retrieval for computer devices such as the host device 204. The disk drive 202 may include a controller 216 that permits access to the disk drive 202. The controller 216 on the disk drive 202 is generally configured to interface with a disk drive plant 218 and a read/write channel 220 to access data on one or more disk(s) 240. Thus, the controller 216 performs tasks such as attaching validation tags (e.g., error correction codes (ECC)) to data before saving it to disk(s) 240 and checking the tags to ensure data from a disk(s) 240 is correct before sending it back to host device 104. The controller 216 may also employ error correction that involves recreating data that may otherwise be lost during failures.

The plant 218 is used herein to include a servo control module 244 and a disk stack 242. The disk stack 242 includes one or more disks 240 mounted on a spindle (not shown) that is rotated by a motor (not shown). An actuator arm (not shown) extends over and under top and bottom surfaces of the disk(s) 240, and carries read and write transducer heads (not shown), which are operable to read and write data from and to substantially concentric tracks (not shown) on the surfaces of the disk(s) 240.

The servo control module 244 is configured to generate signals that are communicated to a voice coil motor (VCM) that can rotate the actuator arm, thereby positioning the transducer heads over and under the disk surfaces. The servo control module 244 is generally part of a feedback control loop that substantially continuously monitors positioning of read/write transducer heads and adjusts the position as necessary. As such, the servo control module 244 typically includes filters and/or amplifiers operable to condition positioning and servo control signals. The servo control module 244 may be implemented in any combination of hardware, firmware, or software.

The definition of a disk drive plant can vary somewhat across the industry. Other implementations may include more or fewer modules in the plant 218; however, the general purpose of the plant 218 is to provide the control to the disk(s) 240 and read/write transducer positioning, such that data is accessed at the correct locations on the disk(s). The read/write channel 220 generally communicates data between the device controller 216 and the transducer heads (not shown). The read/write channel may have one or more signal amplifiers that amplify and/or condition data signals communicated to and from the device controller 216.

Generally, accessing the disk(s) 240 is a relatively time-consuming task in the disk drive 202. The time-consuming nature of accessing (i.e., reading and writing) the disk(s) 240 is at least partly due to the electromechanical processes of positioning the disk(s) 240 and positioning the actuator arm. Time latencies that are characteristic of accessing the disk(s) 240 are more or less exhibited by other types of mass storage devices that access mass storage media, such as tape drives, optical storage devices, and the like.

As a result, mass storage devices, such as the disk drive 202, may employ cache memory to facilitate rapid data I/O responses to the host 204. Cache memory, discussed in more detail below, may be used to store pre-fetched data from the disk(s) 240 that will most likely be requested in the near future by the host 204. Cache may also be used to temporarily store data that the host 204 requests to be stored on the disk(s) 240.

The controller 216 on the storage device 202 typically includes I/O processor(s) 222, main processor(s) 224, volatile RAM 228, nonvolatile (NV) RAM 226, and nonvolatile memory 230 (e.g., ROM, flash memory). Volatile RAM 228 provides storage for variables during operation, and may store read cache data that has been pre-fetched from mass storage. NV RAM 226 may be supported by a battery backup (not shown) that preserves data in NV RAM 226 in the event power is lost to controller(s) 216. As such, NV RAM 226 generally stores data that should be maintained in the event of power loss, such as write cache data. Nonvolatile memory 230 may provide storage of computer readable instructions, data structures, program modules and other data for the storage device 202.

Accordingly, the nonvolatile memory 230 includes firmware 232 and a pre-fetch depth adaptor 234 that facilitates read cache pre-fetch operations. Firmware 232 is generally configured to execute on the processor(s) 224 and support normal storage device 202 operations. Firmware 232 may also be configured to handle various fault scenarios that may arise in the disk drive 202. In the implementation of FIG. 2, the pre-fetch depth adaptor 234 is configured to execute on the processor(s) 224 to analyze various parameters that may affect read cache hit performance, as is more fully discussed herein below.

The I/O processor(s) 222 receives data and commands from the host device 204 via the communications channel 206. The I/O processor(s) 222 communicate with the main processor(s) 224 through standard protocols and interrupt procedures to transfer data and commands between NV RAM 226 and the read/write channel 220 for storage of data on the disk(s) 240.

As indicated above, the implementation of a storage device 202 as illustrated by the disk drive 202 in FIG. 2, includes read cache pre-fetch depth adaptor 234 and cache memory. The read cache pre-fetch depth adaptor 234 is configured to perform several tasks during the normal operation of storage device 202. One of the tasks that the read cache pre-fetch depth adaptor 234 may perform is that of generating various parameters or metrics indicative of the performance of the storage device 202. The pre-fetch depth adaptor 234 may vary the read cache pre-fetch depth in response to the parameters or metrics. The pre-fetch depth adaptor 234 may map the parameters or metrics to a read cache pre-fetch depth value representing an amount of data that will be pre-fetched in a pre-fetch operation.

Read cache pre-fetching generally includes fetching data from a mass storage media, such as one or more disk(s), before a host requests the data. The pre-fetched data may be stored in a cache memory to facilitate rapid output when the host requests the data. The pre-fetched data may be fetched, stored, and retrieved on a page-by-page basis. The size of a page may be any amount of data suitable for a particular implementation. Pre-fetching may also include updating an index table (such as a hash table) that relates host addresses to data that resides in the cache. Read cache pre-fetching may be carried out by executable code, executing a pre-fetching process on the CPU 224.

Figure 3:
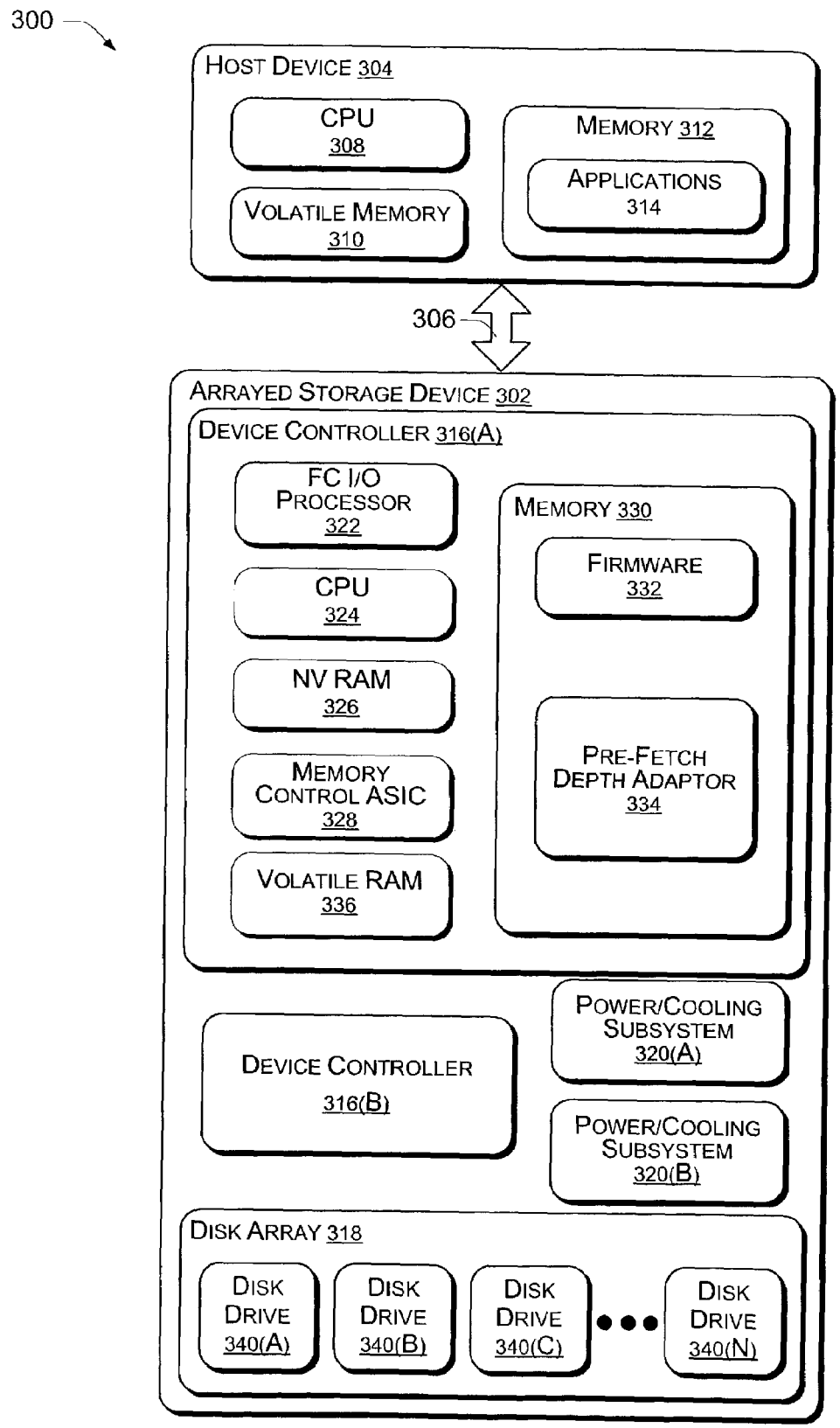
FIG. 3 is a block diagram illustrating in greater detail, another implementation of a host computer device and a storage device as might be implemented in the system environment of FIG. 1.

FIG. 2 illustrates an implementation involving a single disk drive 202. An alternative implementation may be a Redundant Array of Independent Disks (RAID), having an array of disk drives and more than one controller. As is discussed below, FIG. 3 illustrates an exemplary RAID implementation.

RAID systems are specific types of virtual storage arrays, and are known in the art. RAID systems are currently implemented, for example, hierarchically or in multi-level arrangements. Hierarchical RAID systems employ two or more different RAID levels that coexist on the same set of disks within an array. Generally, different RAID levels provide different benefits of performance versus storage efficiency.

For example, RAID level 1 provides low storage efficiency because disks are mirrored for data redundancy, while RAID level 5 provides higher storage efficiency by creating and storing parity information on one disk that provides redundancy for data stored on a number of disks. However, RAID level 1 provides faster performance under random data writes than RAID level 5 because RAID level 1 does not require the multiple read operations that are necessary in RAID level 5 for recreating parity information when data is being updated (i.e. written) to a disk.

Hierarchical RAID systems use virtual storage to facilitate the migration (i.e., relocation) of data between different RAID levels within a multi-level array in order to maximize the benefits of performance and storage efficiency that the different RAID levels offer. Therefore, data is migrated to and from a particular location on a disk in a hierarchical RAID array on the basis of which RAID level is operational at that location. In addition, hierarchical RAID systems determine which data to migrate between RAID levels based on which data in the array is the most recently or least recently written or updated data. Data that is written or updated least recently may be migrated to a lower performance, higher storage-efficient RAID level, while data that is written or updated the most recently may be migrated to a higher performance, lower storage-efficient RAID level.

In order to facilitate efficient data I/O, many RAID systems utilize read cache and write cache. The read and write cache of an arrayed storage device is generally analogous to the read and write cache of a disk drive discussed above. Caching in an arrayed storage device, however, is complicated by the fact that it introduces another layer of caching in addition to the caching that may be performed by the underlying disk drives. In order to take full advantage of the benefits offered by an arrayed storage device, such as speed and redundancy, a read cache pre-fetch depth adaptor advantageously increases the likelihood of a read cache hit. The implementation discussed with respect to FIG. 3 includes a read cache pre-fetch depth adaptor to facilitate effective use of the read cache memory.

FIG. 3 is a functional block diagram illustrating a suitable environment 300 for an implementation including an arrayed storage device 302 in accordance with the system environment 100 of FIG. 1. "Arrayed storage device" 302 and its variations, such as "storage array device", "array", "virtual array" and the like, are used throughout this disclosure to refer to a plurality of storage components/devices being operatively coupled for the general purpose of improving storage performance. The arrayed storage device 302 of FIG. 3 is embodied as a virtual RAID (redundant array of independent disks) device. A host device 304 is embodied generally as a computer such as a personal computer (PC), a laptop computer, a server, a Web server, a handheld device (e.g., a Personal Digital Assistant or cellular phone), or any other computer device that may be configured to communicate with RAID device 302.

The host device 304 typically includes a processor 308, a volatile memory 316 (i.e., RAM), and a nonvolatile memory 312 (e.g., ROM, hard disk, floppy disk, CD-ROM, etc.). Nonvolatile memory 312 generally provides storage of computer readable instructions, data structures, program modules and other data for host device 304. The host device 304 may implement various application programs 314 stored in memory 312 and executed on processor 308 that create or otherwise access data to be transferred via network connection 306 to the RAID device 302 for storage and subsequent retrieval.

The applications 314 might include software programs implementing, for example, word processors, spread sheets, browsers, multimedia players, illustrators, computer-aided design tools and the like. Thus, the host device 304 provides a regular flow of data I/O requests to be serviced by virtual RAID device 302.

RAID devices 302 are generally designed to provide continuous data storage and data retrieval for computer devices such as the host device(s) 304, and to do so regardless of various fault conditions that may occur. Thus, a RAID device 302 typically includes redundant subsystems such as controllers 316(A) and 316(B) and power and cooling subsystems 320(A) and 320(B) that permit continued access to the disk array 302 even during a failure of one of the subsystems. In addition, RAID device 302 typically provides hot-swapping capability for array components (i.e. the ability to remove and replace components while the disk array 318 remains online) such as controllers 316(A) and 316(B), power/cooling subsystems 320(A) and 320(B), and disk drives 340 in the disk array 318.

Controllers 316(A) and 316(B) on RAID device 302 mirror each other and are generally configured to redundantly store and access data on disk drives 340. Thus, controllers 316(A) and 316(B) perform tasks such as attaching validation tags to data before saving it to disk drives 340 and checking the tags to ensure data from a disk drive 340 is correct before sending it back to host device 304. Controllers 316(A) and 316(B) also tolerate faults such as disk drive 340 failures by recreating data that may be lost during such failures.

Controllers 316 on RAID device 302 typically include I/O processor(s) such as FC (fiber channel) I/O processor(s) 322, main processor(s) 324, volatile RAM 336, nonvolatile (NV) RAM 326, nonvolatile memory 330 (e.g., ROM, flash memory), and one or more application specific integrated circuits (ASICs), such as memory control ASIC 328. Volatile RAM 336 provides storage for variables during operation, and may store read cache data that has been pre-fetched from mass storage. NV RAM 326 is typically supported by a battery backup (not shown) that preserves data in NV RAM 326 in the event power is lost to controller(s) 316. NV RAM 326 generally stores data that should be maintained in the event of power loss, such as write cache data. Nonvolatile memory 330 generally provides storage of computer readable instructions, data structures, program modules and other data for RAID device 302.

Accordingly, the nonvolatile memory 330 includes firmware 332 and a pre-fetch depth adaptor 334 that facilitates read cache pre-fetch operations. Firmware 332 is generally configured to execute on the processor(s) 324 and support normal storage device 302 operations. Firmware 332 is generally configured to execute on processor(s) 324 and support normal arrayed storage device 302 operations. In one implementation the firmware 332 includes array management algorithm(s) to make the internal complexity of the array 318 transparent to the host 304, map virtual disk block addresses to member disk block addresses so that I/O operations are properly targeted to physical storage, translate each I/O request to a virtual disk into one or more I/O requests to underlying member disk drives, and handle errors to meet data performance/reliability goals, including data regeneration, if necessary. In the implementation of FIG. 3, the pre-fetch depth adaptor 334 is configured to execute on the processor(s) 324 to analyze various parameters that may affect read cache hit performance, as is more fully discussed herein below.

The FC I/O processor(s) 322 receives data and commands from host device 304 via the network connection 306. FC I/O processor(s) 322 communicate with the main processor(s) 324 through standard protocols and interrupt procedures to transfer data and commands to redundant controller 316(B) and generally move data between volatile RAM 336, NV RAM 326 and various disk drives 340 in the disk array 318 to ensure that data is stored redundantly. The arrayed storage device 302 includes one or more communications channels to the disk array 318, whereby data is communicated to and from the disk drives 340. The disk drives 340 may be arranged in any configuration as may be known in the art. Thus, any number of disk drives 340 in the disk array 318 can be grouped together to form disk systems.

The memory control ASIC 328 generally controls data storage and retrieval, data manipulation, redundancy management, and the like through communications between mirrored controllers 316(A) and 316(B). Memory controller ASIC 328 handles tagging of data sectors being striped to disk drives 340 in the array of disks 318 and writes parity information across the disk drives 340. In general, the functions performed by ASIC 328 might also be performed by firmware or software executing on general purpose microprocessors. Data striping and parity checking are well-known to those skilled in the art.

The memory control ASIC 328 also typically includes internal buffers (not shown) that facilitate testing of memory 330 to ensure that all regions of mirrored memory (i.e. between mirrored controllers 316(A) and 316(B)) are compared to be identical and checked for ECC (error checking and correction) errors on a regular basis. The memory control ASIC 328 notifies the processor 324 of these and other errors it detects. Firmware 332 is configured to manage errors detected by memory control ASIC 328 in a tolerant manner which may include, for example, preventing the corruption of array 302 data or working around a detected error/fault through a redundant subsystem to prevent the array 302 from crashing.

Figure 4:
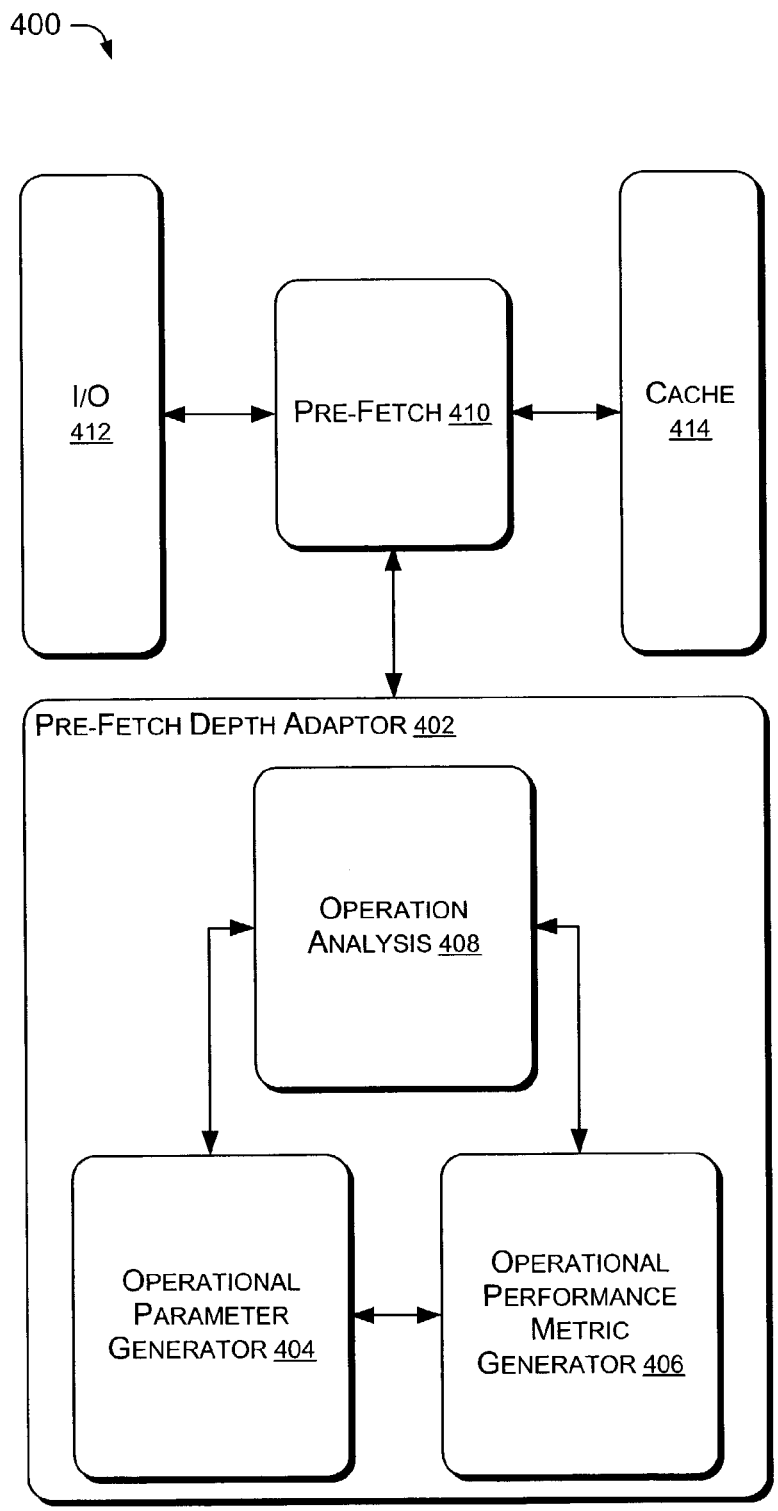
FIG. 4 illustrates an exemplary functional block diagram of a system that may reside in the system environments of FIGS. 1–3, wherein a read cache pre-fetch adaptation module adapts read cache pre-fetch depth in response to operational parameter(s) and/or performance metric(s).

FIG. 4 illustrates an exemplary functional block diagram of a read cache pre-fetch system 400 that may reside in the system environments of FIGS. 1–3, wherein a read cache pre-fetch adaptor 402 adapts read cache pre-fetch depth in response to operational parameter(s) and/or performance metric(s). For ease of description of the system 400, system 400 is described as it may execute within a storage device, such as the disk drive 202 of FIG. 2 or the RAID device 302 of FIG. 3. In the particular implementation of FIG. 4, an operational parameter generator 404 and an operational performance metric generator 406 communicate with an operation analysis module 408, which transmits pre-fetch depth information to a pre-fetch module 410 indicating an amount of data to pre-fetch from mass storage via an I/O processor 412 and store in a read cache 414.

More specifically, the operational parameter generator 404 obtains one or more operational parameters that are characteristic of the operation or usage of the storage device. By way of example, and not limitation, operational parameters include workload type, host request rate, number of workloads, device or component latency, device or component type or model, cache capacity, and the like. The operational parameters may be identified when the storage device is powered-up, initialized, and/or manufactured, and they may be stored in memory for later access. In addition, the operational parameters may be dynamically adjusted or periodically updated as the operation and/or usage of the storage device changes.

The operational parameter generator 404 may obtain or receive the operational parameters from parametric data stored in memory. In one implementation, the operational parameters reside in a parametric table in RAM or ROM. Thus, for example, the operational parameter generator 404 may look-up a disk drive latency, cache capacity, and/or workload type/number in the parametric table. If the table is in RAM, the operational parameters may be automatically or dynamically varied in response to changes in the storage device. The operational parameter generator 404 may or may not perform functions involved in updating and/or maintaining the parametric table. For example, a process thread may run periodically to gather operational parameters and store them in the table, so that the table is updated before other parameter generation functions in the operational parameter generator 404 execute. The process may be part of separate from the operational parameter generator 404.

Operational parameters may dynamically change for any number of reasons. For example, in a RAID device, one disk drive model or type may be substituted for another disk drive model or type, thereby changing characteristics, such as disk drive latency. As another example, in a disk drive, response rate may decrease if errors on the disk media result in increased retries to obtain valid data. As yet another example, in a particular implementation of a storage device, read cache capacity may dynamically vary based on workloads. One way of varying read cache capacity is discussed in the concurrently filed and co-assigned U.S. patent application entitled, "Method of Adaptive Cache Partitioning to Increase Host I/O Performance." In such an implementation, read cache pre-fetch depth may be dynamically adapted in response to dynamic variations in the read cache capacity.

Referring to another implementation of the operational parameter generator 404, the operational parameter generator 404 receives the operational parameters from another module or process in the storage device, which gathers or has the operational parameters. In this implementation, the operational parameter generator 404 may issue a procedure call to the process or module, requesting the operational parameters. The process or module replies to the request with the operational parameters. Alternatively, the module may include an addressable ROM or electronically erasable programmable ROM (EEPROM) storing the operational parameters. In this implementation, the operational parameter generator 404 can address or index into the ROM, the output of which includes the operational parameters.

With regard to the operational parameters themselves, the operational parameters may take any form suitable to the implementation. In a particular implementation, the operational parameters are represented in binary encoded data, such as alphabetical, numerical, or types of indicators. For example, a component latency may be stored as a number representing a response time or delay for the component. The latency may be given by the manufacturer, or may be calculated during operation. As discussed in more detail below, disk or disk drive latencies may be dynamically measured and stored in one or more data structure(s) that map disk addresses to the measured latencies.

As another example of an operational parameter, the workload type may be represented with workload names or numbers. Thus, a random workload type may be given by type 1, a sequential host workload given by type 2, a small transfer length sequential host workload given by type 3, and so on. Alternatively, the workload names may be stored in memory as American Standard Code for Information Interchange (ASCII), or other code, characters (e.g., "RANDOM," "SEQUENTIAL", "SMALL_LENGTH_SEQ," and so on).

The operational parameters from the operational parameter generator 404 may be used later to adjust the read cache pre-fetch depth to vary the storage device performance. The operational parameters may be used directly (i.e., without change) to adjust the read cache pre-fetch depth. Alternatively, the operational parameters may be mapped, transformed, or otherwise used to generate performance metrics that can be used to adjust the read cache pre-fetch depth.

Referring now to the operational performance metric generator 406, the operational performance metric generator 406 receives one or more of the operational parameters from the operational parameter generator 404, either directly from the operational parameter generator 404 or via the operation analysis module 408. Based on the operational parameters, the operational performance metric generator 406 generates one or more performance metrics indicative of performance of the storage device. The performance metrics may later be used to adjust the read cache pre-fetch depth in a way that may vary future metrics.

In a particular implementation of the pre-fetch depth adaptor 402, the operational performance metric generator 406 maps the received operational parameters to predetermined value(s). The value(s) may themselves be indicative of performance or they may be normalized and/or unitized values that are used to calculate metric(s) that are indicative of performance. In one exemplary implementation, the operational performance metric generator 406 receives a disk drive type and model identifier from the operational parameter generator 404 and maps the disk drive type and model identifier to a characteristic latency associated with the disk drive type and model.

In another implementation, the operational performance metric generator 406 receives a workload type indicator and maps the workload type indicator to a value that is used to calculate a metric associated with the workload type or a weighted average of performance metrics. For example, the workload type indicator may be represented by a numerical value (e.g., 2), that is mapped to a workload metric value wherein units of performance measure are taken into account. For example, if a subset of host data is stored on a particular set of drives with a given set of performance characteristics, the pre-fetch adaptor 402 will vary the pre-fetch depth accordingly. This pre-fetch depth may differ from the pre-fetch depth used by another subset of host data that may be stored on a set of drives with a different set of performance characteristics. If the operational performance metric generator 406 calculates a weighted average of a number of performance metrics, an equation such as Eq. (1) below may be employed:

$$\text{Weighted\_Metric} = W_0 \cdot M_0 + W_1 \cdot M_1 + \ldots + W_n \cdot M_n, \quad \text{Eq. (1)}$$

wherein Weighted_Metric is a weighted combination of metrics, $M_0$–$M_n$, and $W_0$–$W_n$ represent weight values for each of the associated metrics, $M_0$–$M_n$. The weights, $W_0$–$W_n$, may be selected by design to give more or less weight to a metric. For example, a greater weight may be assigned to a latency metric than is assigned to a workload metric, or vice versa, depending on the relative importance of the performance metrics.

Each of the metrics, $M_0$–$M_n$, may be obtained by mapping an associated operational parameter to the metric. In one implementation of the operational performance metric generator 406, the mapping is performed by a table look-up, wherein the table contains a metric associated within an input operational parameter. In an alternative implementation, the operational performance metric generator 406 may numerically manipulate the operational parameter using an equation such as Eq. (2) below:

$$M_i = k \cdot P_i, \quad \text{Eq. (2)}$$

wherein $M_i$ represents the metric associated with an operational parameter, $P_i$, and "k" represents a transformation. The transformation, k, may be selected by design such that an appropriate metric, $M_i$, is yielded. The transformation, k, may be a scaling factor to appropriately scale parameter value(s) $P_i$. Thus, the value of k may depend on a number of implementation-specific factors, such as the range of possible values for $P_i$, the range of desired values for $M_i$, the units of measure (if any) for $P_i$, the units of measure for $M_i$, and others.

In a particular implementation of the operational performance metric generator 406, read cache effectiveness measures, such as read cache hit ratio and read cache miss ratio are generated. In this implementation, the operational performance metric generator 406 may divide, or otherwise combine, a read cache hit count by a total host read count to yield the read cache hit ratio. The read cache hit ratio may be calculated by dividing, or otherwise combing, a read cache miss count by a total host read request count. Alternatively, the read cache miss ratio may be calculated by first generating the read cache hit ratio and subtracting the read cache hit ratio from one. In this implementation, one or more read cache effectiveness parameters, such as read cache hit count, read cache miss count, or total host read request count may be supplied by the operational parameter generator 404.

Referring now to the operational analysis module 408, the operational analysis module 408 is in operable communication with the operational parameter generator 404 and the operational performance metric generator 406 to analyze operational data to determine a read pre-fetch depth. The operational analysis module 408 may transfer data, such as operational parameters or operational metrics, to and from the operational parameter generator 404 and the operational performance metric generator 406 in order to facilitate performance analysis. Based on the performance analysis, the operational analysis module 408 may determine a pre-fetch depth and/or a change in the pre-fetch depth, which may be transferred to the pre-fetch module 410 to facilitate adaptive read cache pre-fetching.

In one implementation of the operation analysis module 408, operational parameters from the operational parameter generator 404 are used to determine whether to change the read cache pre-fetch depth. For example, the read cache pre-fetch depth may be increased in response to an increase in the rate of host read requests. As another example, the read cache pre-fetch depth may be increased if the response time of disk drives (e.g., in a RAID device) increase. As another example, the read cache pre-fetch depth may be decreased in response to a reduced transfer length host read workload.

In a particular implementation of the operation analysis module 408, operational performance metrics from the operation performance metric generator 406 are used to determine whether to change the read cache pre-fetch depth. For example, if the read cache hit ratio increases, the read cache pre-fetch depth may not be changed. As another example, if a weighted average metric (e.g., the Weighted_Metric from Eq. (1)) decreases, the read cache pre-fetch depth may be increased, assuming an inverse relationship between the weighted average metric and the read cache pre-fetch depth. As another example, a workload metric indicative of increasing complexity or number of workloads may cause an increase or decrease in the read cache pre-fetch depth. As yet another example, the read cache pre-fetch depth may be varied if one or more of the operational performance metrics are not at least at a predetermined benchmark level. For example, a particular streaming video application may require a minimum, or benchmark, data rate of X MB/second in order to avoid delays in presentation. In this example, the pre-fetch depth can be varied until the benchmark data rate, X MB/second, is achieved.

In yet another implementation of the operation analysis module 408, the read cache pre-fetch depth may be determined based on a combined analysis of operational parameters and operational performance metrics. For example, an decreasing cache hit rate metric may cause an increase in the read cache pre-fetch depth only if the workload type does not change. As another example, the read cache pre-fetch depth may be increased in response to an increased cache capacity parameter only if a read cache miss ratio metric has increased.

In one implementation of the operation analysis module 408, the pre-fetch depth is varied in predetermined steps or deltas. The size of the steps may be in units of bytes, kilobytes, pages, blocks, or any other measure of addresses and/or data. In this implementation, the operation analysis module 408 has a current pre-fetch depth and either adds or subtracts a predetermined address range to the current pre-fetch depth. For example, if the operation analysis module 408 determines that the read cache pre-fetch depth should be increased, a predetermined number of pages may be added to the current pre-fetch depth. As another example, if the operation analysis module 408 determines that the read cache pre-fetch depth should be reduced, a predetermined number of pages may be subtracted from the current pre-fetch depth. In this implementation, the pre-fetch depth is limited to a minimum pre-fetch depth (for example, one page) and a maximum pre-fetch depth (e.g., six pages).

Based on the determination of whether to vary the pre-fetch depth, one implementation of the operation analysis module 408 generates a pre-fetch depth delta value, representing how much to increase or decrease the read cache pre-fetch depth. The pre-fetch depth delta value may be a function of performance metrics. One implementation maps ranges of performance metrics to pre-fetch depth values using a look-up table. Another implementation uses a calculation, such as that shown in Eq. (3) below:

$$\text{PreFetchDepth\_Delta} = h \cdot (M_{iq} - M_{ip}), \quad \text{Eq. (3)}$$

wherein PreFetchDepth_Delta represents a change in read cache pre-fetch depth, "h" is a scaling factor, $M_{iq}$ represents a metric $M_i$ at an initial time or sampling "q", and $M_{ip}$ represents the metric $M_i$ at a later time or sampling "p". The scaling factor may be selected to ensure the PreFetchDepth_Delta is kept within a desired range, and may depend on several implementation-specific factors, such as, the units of PreFetchDepth_Delta, and the units of $M_i$. In this particular implementation, the PreFetchDepth_Delta is limited to by minimum and maximum boundary values. After calculating the PreFetchDepth_Delta using Eq. (3), if the PreFetchDepth_Delta is less than the minimum, the PreFetchDepth_Delta is set equal to the minimum; if PreFetchDepth_Delta is greater than the maximum, PreFetchDepth_Delta is set equal to the maximum.

In another implementation, the operation analysis module 408 generates a pre-fetch depth value. The pre-fetch depth value represents an amount or range of addresses and/or data by which to fetch into a host address space. The pre-fetched host addresses are mapped into physical locations on the mass media device, such as on a disk in a disk drive. The generated pre-fetch depth value may be given in terms of kilobytes, pages, sub-pages, blocks, or any other measure of a range of addresses and/or data. In one particular implementation, the operation analysis module 408 maps operational parameters and/or operational metrics to pre-fetch depth values using a look-up table. In another particular implementation, the operation analysis module maps operational metrics to a pre-fetch depth value using an equation, such as Eq. (4) shown below:

$$\text{PreFetchDepth} = \text{BasePreFetchDepth} + \text{PreFetchDepth\_Delta}, \quad \text{Eq. (4)}$$

wherein PreFetchDepth represents a new pre-fetch depth, BasePreFetchDepth represents a starting or base value for pre-fetch depth, and PreFetchDepth_Delta represents a variation in the pre-fetch depth, such as the PreFetchDepth_Delta shown in Eq. (3) above. In this particular implementation, the PreFetchDepth is bounded to by minimum and maximum pre-fetch depth values, whereby the PreFetchDepth calculated with Eq. (4) is limited to a lower minimum value and an upper maximum value. In a particular implementation, the minimum value is 64 kB and the maximum value is 512 kB.

The various modules illustrated in FIG. 4 may be implemented in any combination of software, hardware, or firmware. In addition, the exemplary modules, processes, and functions may be combined and/or separated in any way as is suitable to the implementation whereby the substantial utility of the system is still achieved.

Figure 5:
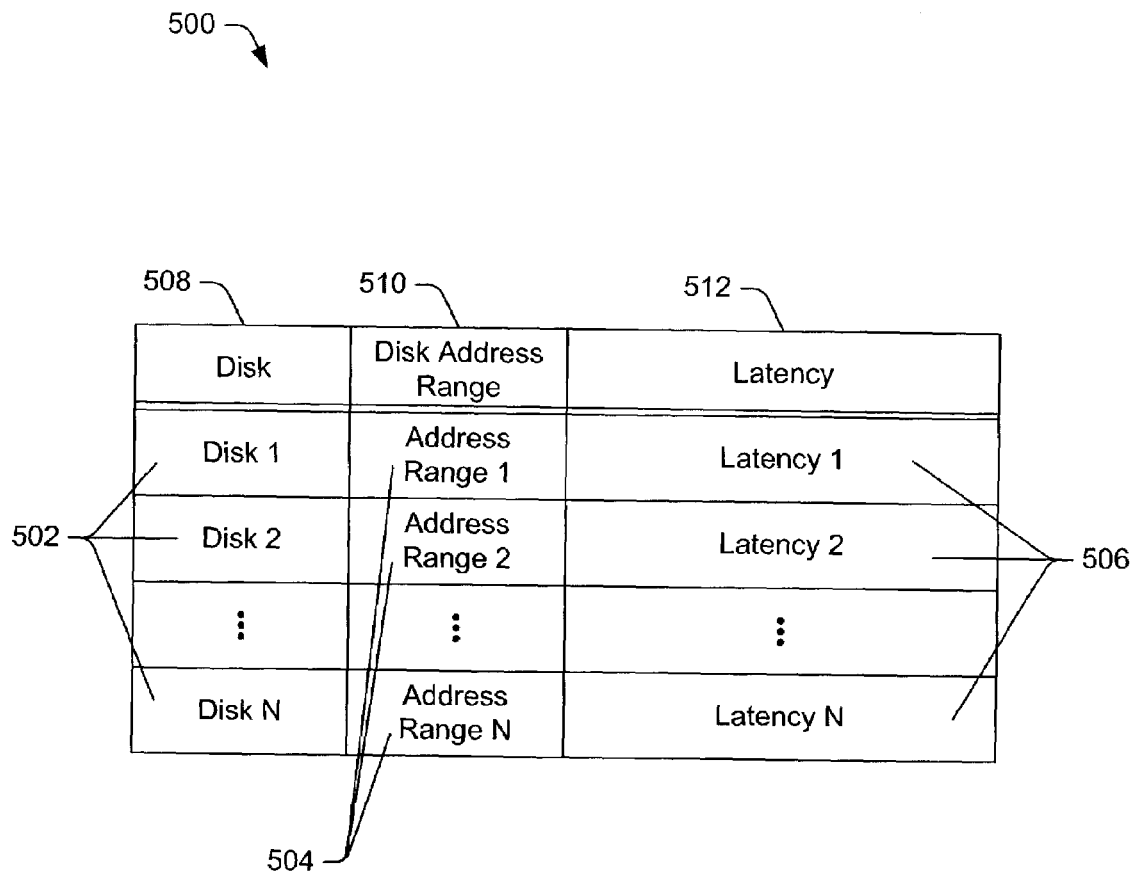
FIG. 5 illustrates an exemplary data structure that may reside in the systems shown in FIGS. 1–4 for adapting pre-fetch depth based on operational parameter(s) and/or performance metric(s).

FIG. 5 illustrates an exemplary disk latency data structure 500 that may reside in memory (e.g., the NV RAM 226, volatile RAM 228, or memory 230, FIG. 2; the NV RAM 326, volatile RAM 336, or memory 330, FIG. 3) of the systems shown in FIGS. 1–4 for adapting pre-fetch depth based on operational parameter(s) and/or performance metric(s). The data structure contains processor (for example, the CPU 224, FIG. 2; the CPU 324, FIG. 3)—readable binary encoded data representing the parameters and/or metrics corresponding to various memory address ranges. In general, the data structure 500 provides a mapping of latency values to disks (or disk drives, as in a RAID implementation) and the memory address ranges.

The disk latency data structure 500 logically relates disk identifiers 502, with address ranges 504, and latencies 506. A disk identifier column 508, a disk address range column 510, and a disk latency column 512 are shown for illustrative purposes only and are not intended to describe how the disk identifiers 502, the address ranges 504, and the disk latencies 506 might be physically arranged in memory. In operation, the disk identifiers 502, the address ranges, and the disk latencies 506 may be physically arranged in any manner in memory.

Although the disk identifiers 502, the address ranges 504, and the disk latencies 506 may be physically located anywhere in memory, an implementation may logically associate the disk identifiers 502, the address ranges 504, and the disk latencies 506 using any mechanism as may be known in the art. One implementation may utilize a linked list. Another implementation may employ a doubly-linked list. Yet another implementation may define a two dimensional array. Regardless of the particular implementation used, the data structure 500 may be indexed, or addressed, whereby any or all of the disk identifiers 502, the address ranges 504, and the latencies 506 may be searched upon, looked-up, and/or modified by the processor.

In one implementation, one or more address ranges 504 represent memory address ranges corresponding to one or more disks 504. Each of the address ranges 504 may include any number of memory addresses that are contiguous or noncontiguous. The address ranges 504 may by specified in any memory units as may be known in the art, and may depend on the particular implementation. In one implementation, the address ranges 504 are specified in terms of one or more logical units (LUN) and one or more logical block addresses (LBA). In another implementation, the address ranges 504 may be specified in terms of physical cylinder head sector (PCHS) addresses.

Using the data structure 500, when the host requests data in a requested address range, the microprocessor can search for the requested address range among the address ranges 504. If the requested address range is found among the address ranges 504, the corresponding disk identifier 503 and/or latency value 506 may be generated using the logical relationships of the data structure 500. For example, if the host requests address(es) in the range of address range 2 (504), the microprocessor identifies disk 2 (502) and latency 2 (506), corresponding to the requested address range.

After a disk latency value corresponding to a requested address range has been determined, the read cache pre-fetch depth may be adapted based on the corresponding latency value. The latency values 506 may be specified in any units as may be known in the art. In one implementation, the latency values 506 are given in disk revolutions. In another implementation, the latency values 506 are given in time units, such as microseconds.

As discussed, in a particular implementation, the latency values 506 may be dynamically updated during operation. In such an implementation, latencies associated with each disk 502 might be periodically measured as part of a performance check, or measured when the disk 502 is accessed in response to host requests. Measuring latencies of disks may involve using a counter module to determine a response time of the disks 502 when the disks are accessed. Other methods and systems for measuring disk latencies are known by those skilled in the art and may be used in this implementation.

In another implementation, the latency values 506 are set one time but remain unchanged thereafter. In this implementation, the latency values 506 may be initialized in memory at power-up. Alternatively, the latency values 506 may reside in read only memory, such as an EEPROM, that is programmed at the time the storage device is manufactured.

Figure 6:
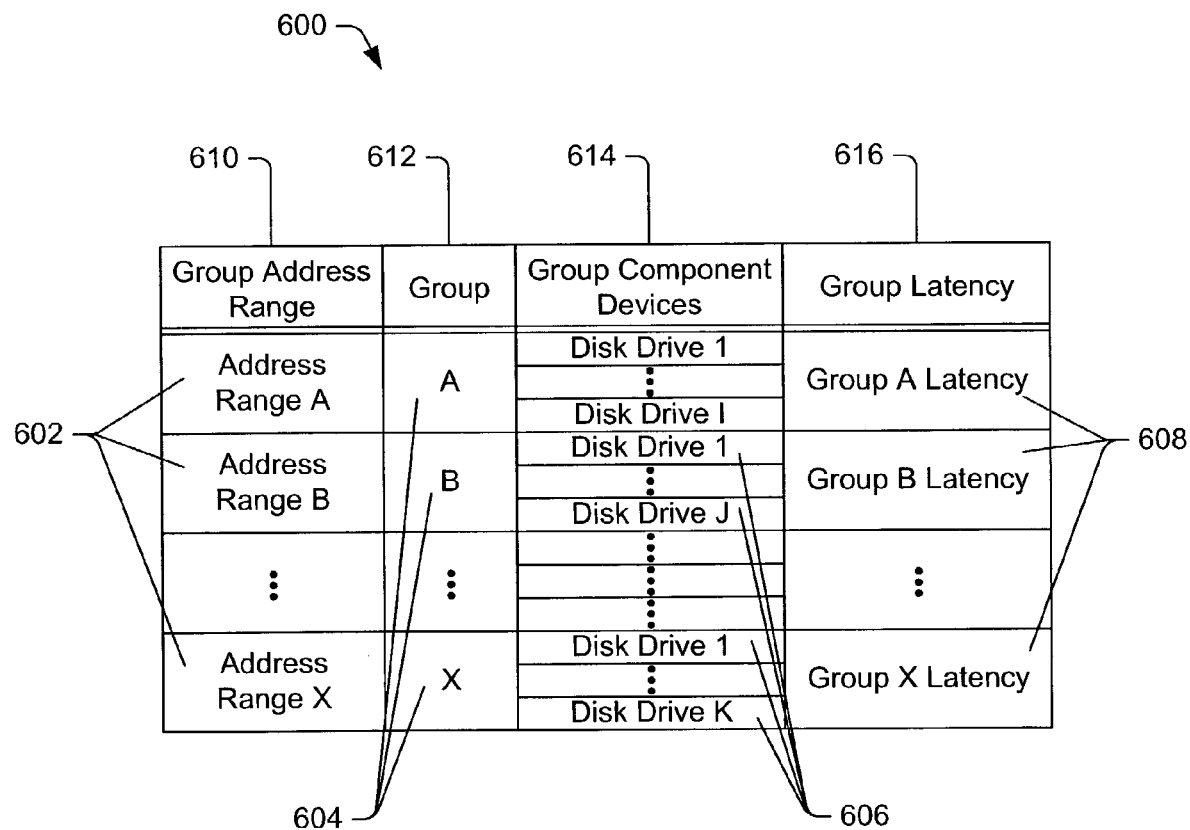
FIG. 6 illustrates another exemplary data structure that may reside in the systems shown in FIGS. 1–4 for adapting pre-fetch depth based on operational parameter(s) and/or performance metric(s).

FIG. 6 illustrates an exemplary group latency data structure 600 that may reside in memory (e.g., the NV RAM 226, volatile RAM 228, or memory 230, FIG. 2; the NV RAM 326, volatile RAM 336, or memory 330, FIG. 3) of the systems shown in FIGS. 1–4 for adapting pre-fetch depth based on operational parameter(s) and/or performance metric(s). The data structure contains computer-readable binary encoded data representing the parameters and/or metrics. In general, the data structure 600 provides a mapping of latency values to disk groups, component devices, and memory address ranges.

The group latency data structure 600 logically relates address ranges 602, group identifier 604, group component devices 606, and group latencies 608. An address range column 610, a group identifier column 612, a group component devices column 614, and a group latencies column 614 are shown for illustrative purposes only, and are not intended to describe how the address ranges 602, group identifier 604, group component devices 606, and group latencies 608 might be physically arranged in memory. In operation, the address ranges 602, group identifier 604, group component devices 606, and group latencies 608 may be physically arranged in any manner in memory.

Although the address ranges 602, group identifier 604, group component devices 606, and group latencies 608 may be physically located anywhere in memory, an implementation may logically associate the address ranges 602, group identifier 604, group component devices 606, and group latencies 608 using any mechanism as may be known in the art. As with the disk latency data structure 500 in FIG. 5, one implementation of the group latency data structure 600 may utilize a linked list. Another implementation may employ a doubly-linked list. Yet another implementation may define one or more two dimensional arrays. Regardless of the particular implementation used, the group latency data structure 600 may be indexed, or addressed, whereby any or all of the address ranges 602, group identifiers 604, group component devices 606, and group latencies 608 may be searched upon, looked-up, and/or modified by the processor.

The data structure 600 may be particularly well-suited for a RAID implementation wherein multiple disk drives may be grouped. Groups of disk drives 606 may be identified by group identifiers 604. The identified groups 604 may have corresponding representative latencies 608. The latencies 608 may be average latencies, aggregate latencies, or some other combination of disk drive latencies characteristic of the group component disk drives 606.

In a particular implementation, a microprocessor generates latency values using the group data structure 600 in manner similar to that described with regard to the disk latency data structure 500, shown in FIG. 5. The latency values 608 may be used to adapt the read cache pre-fetch depth. In one implementation, the latency values 608 may be dynamically changed during operation in a manner as described with respect to the latency values 506 in FIG. 5. In another implementation, the latency values 608 may be set once and unchanged thereafter.

Figure 7:
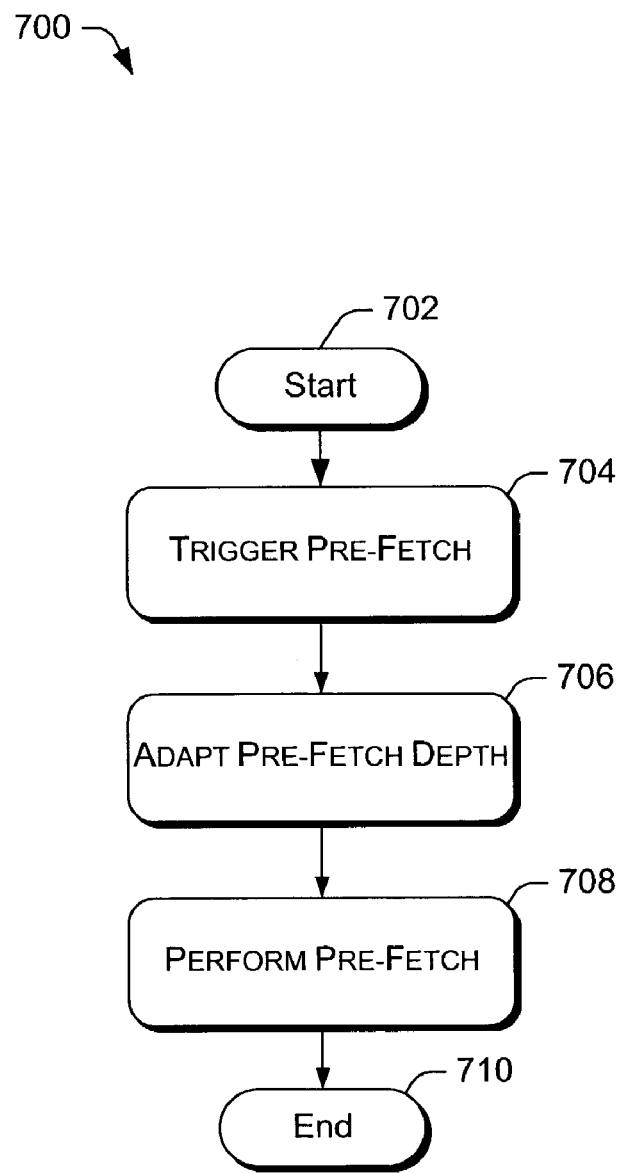
FIG. 7 illustrates an operational flow having exemplary operations that may be executed in the systems of FIGS. 1–4 for adapting a read cache pre-fetch depth.

FIG. 7 illustrates an operational flow 700 having exemplary operations that may be executed in the systems of FIGS. 1–4 for adapting a read cache pre-fetch depth. The pre-fetch depth may be used during a pre-fetch operation and may be used and/or adapted after a pre-fetch operation is triggered.

After a start operation 702, a trigger operation 704 triggers the pre-fetch operation. The trigger operation 704 initiates or launches the pre-fetch operation. A pre-fetch may be triggered in response to various situations and using any mechanism as may be known in the art. In a particular implementation, a pre-fetch is triggered after a sequential host workload is detected. Another implementation utilizes systems and methods discussed in a concurrently filed and co-assigned U.S. patent application entitled, "Method of Triggering Read Cache Pre-Fetch to Increase Host Read Throughput."

Regardless of the method used to trigger a read cache pre-fetch, an adapt operation 706 adapts the pre-fetch depth that is used in the pre-fetch operation. In one implementation of the operation flow 700, the adapt operation 706 is part of or includes a process that executes periodically or as a thread (for example, in execute in background processing). In another implementation, the adapt operation 706 executes in response to triggering the pre-fetch operation.

With reference to functions performed in the adapt operation 706, in one implementation, the adapt operation 706 may adjust or vary the pre-fetch depth based on operational metrics indicative of system performance. In another implementation, the adapt operation 706 may adjust the pre-fetch depth based on operational parameters characteristic of system performance. In yet another implementation, the adapt operation 706 may adjust pre-fetch depth based on a combination of operational metrics and operational parameters.

More specifically, in one implementation, the adapt operation 706 receives a current read cache pre-fetch depth, and one or more operational metrics and/or parameters. Based on the operational metrics and/or parameters, the adapt operation 706 may adjust the current read cache pre-fetch depth by some amount to yield a next read cache pre-fetch depth.

The amount of memory by which the read cache pre-fetch depth may be adjusted may be given in any units of memory measure, such as kilobytes, pages, sub-pages. The read cache pre-fetch depth may be adapted regardless of page or buffer size used for storing incoming data in the cache. For example, one implementation uses a fixed buffer size in the cache, but the pre-fetch depth may be adapted in response to operational parameters, such as host workload type. The adapt operation 706 may output a change or delta value that represents an amount by which to increase or decrease the pre-fetch depth; or, the adapt operation 706 may output the next read cache pre-fetch depth (i.e., the current read cache pre-fetch depth combined with the change value).

In one implementation, the adapt operation 706 may generate a notification to skip some amount of memory, rather than read the next contiguous data in the pre-fetch operation. In this implementation, the adapt operation 706 may yield a starting address of the next data to be read cache pre-fetched, wherein the starting address is not contiguous to the previously pre-fetched data. This implementation of the adapt operation 706 may also generate the next read cache pre-fetch depth along with the starting address of the data to be pre-fetched. This particular implementation of the adapt operation 706 may be useful in many situations, including, for example, a situation in which the host workload is at a very high rate, and it is determined that the pre-fetching contiguous blocks of data is not keeping up with the host workload. Such a situation may be indicated by a high or rapidly increasing read cache miss ratio.

A perform operation 708 performs the pre-fetch that was triggered in the trigger operation 704 and using the information generated by the adapt operation 706. Thus, the perform operation 708 fetches data from memory address(es) as indicated by the adapt operation 706. In and implementation in which the adapt operation 706 specifies a starting address and read cache pre-fetch depth, the perform operation 708 starts at the specified start address and fetches the amount of data specified by the read cache pre-fetch depth. In another implementation in which the adapt operation 706 does not specify a starting address, but only specifies the read cache pre-fetch depth, the perform operation 708 fetches data contiguous to the address memories of previously pre-fetched data. After the perform operation 708, the operation flow 700 ends at end operation 710.

Figure 8:
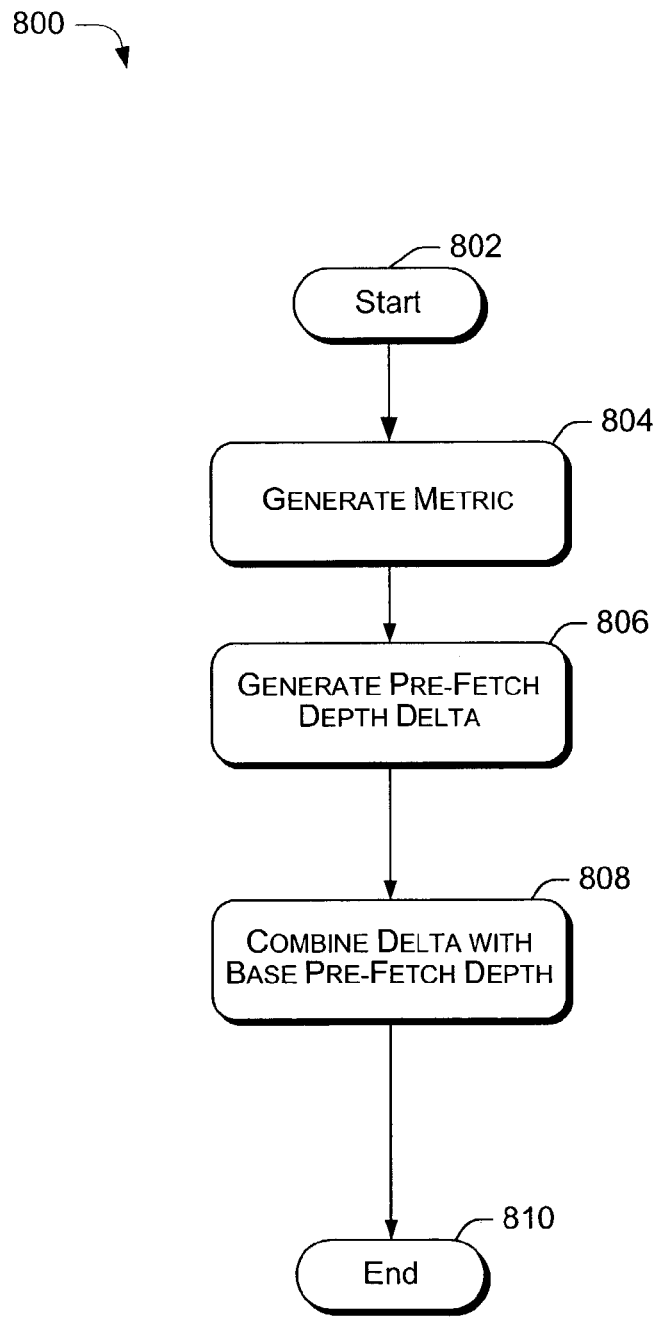
FIG. 8 illustrates an operational flow having exemplary operations that may be executed in the systems of FIGS. 1–4 for computing a read cache pre-fetch depth based on system metric(s).

FIG. 8 illustrates an operational flow 800 having exemplary operations that may be executed in the systems of FIGS. 1–4 for computing a read cache pre-fetch depth based on system metric(s). The exemplary operation flow 800 uses a performance metric to generate a read cache pre-fetch delta and combines the read cache pre-fetch delta with a base, or starting, read cache pre-fetch delta.

The operation flow 800 starts at start operation 802. A generate operation 804 generates one or more metrics indicative of system performance. In one implementation of the generate operation 804, a read cache hit ratio is generated. The read cache hit ratio indicates a rate at which data in the read cache is being used to satisfy read requests from the host, and may be calculated using any method as may be known in the art. Other implementations of the generate operation 804 generate metrics other than, or in addition to, a read cache hit rate. One implementation generates a weighted average of relevant metrics, as discussed above.

A generate delta operation 806 uses the metric(s) from the generate metric operation 804 to obtain a delta value. The delta value represents an amount by which to change a base read cache pre-fetch depth. In one implementation, if the read cache hit ratio is decreasing, the pre-fetch depth delta is a predetermined non-zero value. In this implementation, the pre-fetch depth delta may be generated using equations, such as those discussed above. In another implementation, memory tables may be used to obtain the read cache pre-fetch depth delta, wherein the memory tables relate or map read cache hit ratio values to values of pre-fetch depth delta.

A combine operation 808 uses the read cache pre-fetch depth delta from the generate delta operation 806, to obtain a new read cache pre-fetch depth. In one implementation, the combine operation 808 adds the pre-fetch delta to a base, or starting, read cache pre-fetch depth. In this implementation, the base read cache pre-fetch depth may be a previous read cache pre-fetch depth. Alternatively, the base read cache pre-fetch depth may be an initial value for the read cache pre-fetch depth, such as an initial value stored in memory on power up. In one implementation of the combine operation 808, the new read cache pre-fetch depth is limited to a range of values between a minimum depth and a maximum depth in order to avoid undesirable affects, such as out of control, or thrashing situations.

Figure 9:
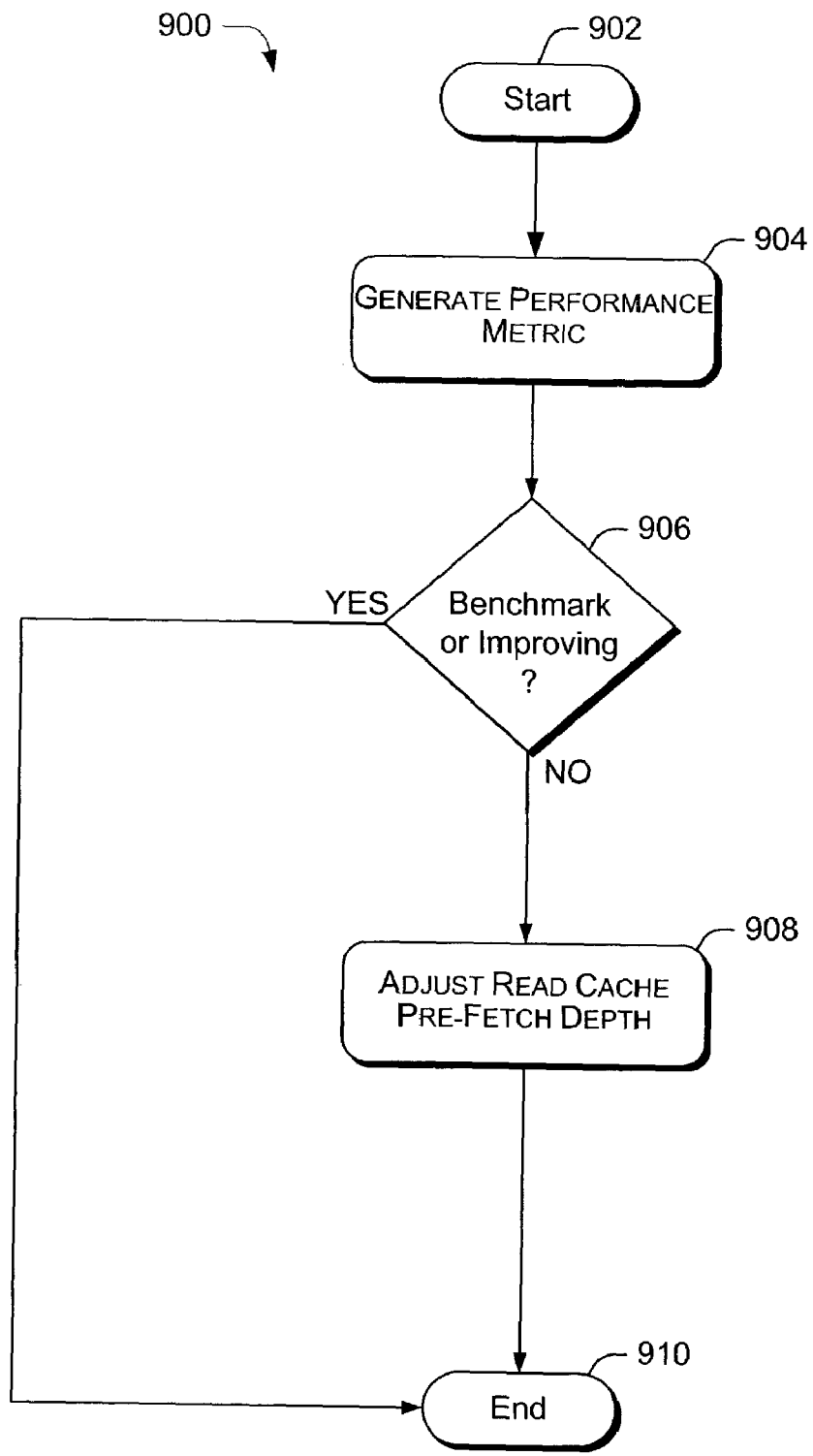
FIG. 9 illustrates an operational flow having exemplary operations that may be executed in the systems of FIGS. 1–4 for determining whether to adapt read-cache pre-fetch depth based on performance metric(s).

FIG. 9 illustrates an operational flow 900 having exemplary operations that may be executed in the systems of FIGS. 1–4 for tuning a read cache pre-fetch depth based on performance metric(s) and/or parameters. A performance metric is generated and tested. Based on testing results, a pre-fetch depth is either increased, decreased or left unchanged.

After a start operation 902, a generate operation 904 generates a performance metric. In one implementation, the generate operation 904 generates a metric indicative of workload complexity. In one implementation, the workload complexity metric is a value between 1 and 10 and increases with increasing workloads, host requests, host request arrival rate, and the like. In another implementation of the generate operation 904, a mass storage device latency is obtained. Thus, the metric generated may be based on operational parameters, such as types of host workload, host request arrival rate, disk drive models, and others. Methods of generating metrics include, but are not limited to, computational and table look-up, such as those discussed above.

A query operation 906 tests the metric from the generate operation 904. In one implementation, the query operation 906 compares the metric to a desired benchmark value. In this implementation of the query operation 906, if the metric is substantially equal to the benchmark, the pre-fetch depth will not be changed. In this implementation, the query operation 906 determines whether the metric is within a range of the benchmark, such as within 5% of the benchmark. The benchmark may be an industry specified benchmark, or the benchmark may be any value that is considered optimal by the particular designer of the system.

In another implementation of the query operation 906, the metric is tested to determine whether the metric is improving. Whether the metric is improving is based on any standard of improvement and depends on the particular metric tested. In one implementation, the metric is the workload complexity metric discussed above. In this implementation, as the workload metric increases, the complexity increases, and hence, the metric would not be improving. In another implementation, wherein the metric is disk drive latency, as disk drive latency decreases, the metric improves. In yet another implementation, wherein read cache hit ratio is the metric, an increasing read cache hit ratio is an improving metric.

If the query operation 906 determines that the metric has not reached a desired benchmark level, and/or is not neither improving, the operation flow 900 branches "NO" to an adjust operation 908. The adjust operation 908 adjusts a read cache pre-fetch depth for future read cache pre-fetch operations. In one implementation of the adjust operation 908, the read cache pre-fetch depth is increased or decreased by an integer multiple of pages. In another implementation, the adjust operation 908 increases or decreases the read cache pre-fetch depth by a predetermined number of kilobytes.

In one implementation of the adjust operation 908, the performance metric is used to obtain a new value for the read cache pre-fetch depth. As discussed herein, computational methods may be used to execute a transformation on the metric to yield a new value for the read cache pre-fetch depth. Alternatively, the adjust operation 908 may use a look-up table that maps ranges of the metric to predetermined values of the read cache pre-fetch depth. Yet another alternative includes both computational methods and look-up tables to yield the new value of the read cache pre-fetch depth.

Whether the adjust operation 908 increases or decreases the read cache pre-fetch depth is implementation dependent. The adjust operation 908 may increase or decrease the pre-fetch depth depending on factors such as a particular performance level to be achieved, the particular parameter being analyzed, the size of the read cache, etc. In a particular implementation, the operational flow 900 is repeatedly executed during operation. Thus, the operational flow 900 may be referred to as a tuning operation, wherein the adjusting operation 908 repeatedly adjusts the pre-fetch depth to fit system performance.

Although the description above uses language that is specific to structural features and/or methodological acts, it is to be understood that the subject matter of the appended claims is not limited to the specific features or acts described. Rather, the specific features and acts are disclosed as exemplary forms of implementation. In addition, the exemplary operations described above are not limited to the particular order of operation described, but rather may be executed in another order or orders and still achieve the same results described.

We claim:

1. A processor-readable medium comprising processor-executable instructions configured for executing a method comprising:

receiving one or more operational parameters characteristic of a storage device; and adapting a read cache pre-fetch depth based at least in part on the one or more parameters;

wherein the one or more parameters comprise at least one operational performance metric, and the adapting a read pre-fetch depth comprises:

determining whether the at least one operational performance metric is not improving; and if the at least one performance metric is not improving, adjusting the read cache pre-fetch depth; and wherein the at least one operational performance metric comprises a read cache hit ratio.

2. A processor-readable medium comprising processor-executable instructions configured for executing a method comprising:

receiving one or more operational parameters characteristic of a storage device; and adapting a read cache pre-fetch depth based at least in part on the one or more parameters;

wherein the one or more operational parameters comprise at least one component performance property metric, and the adapting the read cache pre-fetch depth comprises adjusting the read cache pre-fetch depth if the component performance property metric is less than a predetermined value; and wherein the at least one component performance property metric comprises a disk response time.

3. A processor-readable medium comprising processor-executable instructions configured for executing a method comprising:
receiving one or more operational parameters characteristic of a storage device; and
adapting a read cache pre-fetch depth based at least in part on the one or more parameters;
wherein the one or more operational parameters comprise at least one host workload metric, and the adapting the read cache pre-fetch depth comprises:
determining whether the host workload metric is increasing; and
adjusting the read cache pre-fetch depth if the host workload metric is increasing.

4. A processor-readable medium comprising processor-executable instructions configured for executing a method comprising:
receiving one or more operational parameters characteristic of a storage device; and
adapting a read cache pre-fetch depth based at least in part on the one or more parameters;
wherein the adapting the read cache pre-fetch depth comprises:
generating one or more metrics based on the one or more operational parameters; and
varying the read cache pre-fetch depth in response to a variation in the one or more metrics; and
wherein the generating one or more metrics comprises:
generating a weight average of the one or more metrics.

5. A processor-readable medium comprising processor-executable instructions configured for executing a method comprising:
receiving one or more operational parameters characteristic of a storage device; and
adapting a read cache pre-fetch depth based at least in part on the one or more parameter;
wherein the adapting the read cache pre-fetch depth comprises:
generating one or more metrics based on the one or more operational parameters; and
varying the read cache pre-fetch depth in response to a variation in the one or more metrics; and
wherein the varying the read cache pre-fetch depth comprises:
adding a read cache pre-fetch depth delta to a read cache pre-fetch depth base.

6. A processor-readable medium comprising processor-executable instructions configured for executing a method comprising:
receiving one or more operational parameters characteristic of a storage device; and
adapting a read cache pre-fetch depth based at least in part on the one or more parameters;
wherein the adapting the read cache pre-fetch depth comprises:
generating one or more metrics based on the one or more operational parameters; and
varying the read cache pre-fetch depth in response to a variation in the one or more metrics; and
wherein the varying the read cache pre-fetch depth comprises:
subtracting a read cache pre-fetch depth delta to a read cache pre-fetch depth base.

7. A processor-readable medium as recited in claim 5, wherein the pre-fetch depth delta comprises a multiple of the one or more metrics.

8. A method comprising:
generating an operational parameter characteristic of a data storage device having a read cache; and
adapting a read cache pre-fetch depth in response to a variation in the operational parameter;
wherein the adapting the read cache pre-fetch depth comprises:
generating a read cache pre-fetch depth delta; and
combining the read cache pre-fetch depth delta with a read cache pre-fetch depth base.

9. A method comprising:
generating an operational parameter characteristic of a data storage device having a read cache; and
adapting a read cache pre-fetch depth in response to a variation in the operational parameter;
wherein generating an operational parameter comprises generating a data storage device latency; and
wherein the generating the data storage device latency comprises:
looking up the data storage device latency in a latency table.

10. A method comprising:
generating an operational parameter characteristic of a data storage device having a read cache; and
adapting a read cache pre-fetch depth in response to a variation in the operational parameter;
wherein the data storage device is a Redundant Array of Independent Disks (RAID) having a plurality of disk drives, and the adapting the read cache pre-fetch depth comprises:
generating a disk latency associated with a selected disk drive in the plurality of disk drives; and
varying the read cache pre-fetch depth based on the disk latency; and
wherein the generating a disk latency comprises:
associating a disk latency with each of one or more disk drives in the plurality of disk drives;
storing the disk latency associated with each of the one or more disk drives in a table; and
looking up the disk latency associated with the selected disk drive in the table.

11. A method comprising:
generating an operational parameter characteristic of a data storage device having a read cache; and
adapting a read cache pre-fetch depth in response to a variation in the operational parameter;
wherein the data storage device is a Redundant Array of Independent Disks (RAID) having a plurality of disk drives, and the adapting the read cache pre-fetch depth comprises:
generating a disk latency associated with a selected disk drive in the plurality of disk drives; and
varying the read cache pre-fetch depth based on the disk latency; and
wherein the generating a disk latency comprises:
calculating a disk latency associated with each of a disk grouping having one or more disk drives in the plurality of disk drives.

12. A storage device comprising:
a mass storage medium;
a read cache memory in operable communication with the mass storage medium;
an input/output module operable to receive read requests; and a read cache pre-fetch adaptation module operable to vary a read cache pre-fetch depth in response to one or more operational parameters characteristic of the storage device;

wherein the read cache pre-fetch adaptation module comprises an operational parameter generation module operable to generate the one or more operational parameters; and wherein the operational parameter generation module comprises an operational parameter table having an operational parameter associated with each of a plurality of data storage components.

13. A storage device comprising:

a mass storage medium;

a read cache memory in operable communication with the mass storage medium;

an input/output module operable to receive read requests; and a read cache pre-fetch adaptation module operable to vary a read cache pre-fetch depth in response to one or more operational parameters characteristic of the store device;

wherein the read cache pre-fetch adaptation module comprises an operational parameter generation module operable to generate the one or more operational parameters; and wherein the operational parameter generation module is further operable to dynamically determine the one or more operational parameters.

14. A storage device comprising:

a mass storage media;

a read cache in operable communication with the mass storage media, wherein pre-fetched data from the mass storage media may be stored in the read cache;

an input/output module operable to receive a read request; and means for adapting a read cache pre-fetch depth in response to one or more operational parameters characteristic of the storage device;

wherein the means for adapting the read cache pre-fetch depth comprises an operational performance metric generator operable to generate one or more operational performance metrics indicative of storage device performance.

15. A storage device comprising:

a mass storage media;

a read cache in operable communication with the mass storage media, wherein pre-fetched data from the mass storage media may be stored in the read cache;

an input/output module operable to receive a read request; and means for adapting a read cache pre-fetch depth in response to one or more operational parameters characteristic of the storage device;

wherein the means for adapting the read cache pre-fetch depth comprises an operational parameter generator operable to generate the one or more operational parameters; and wherein the means for adapting the read cache pre-fetch depth further comprises an operational performance metric generator in operable communication with the operational parameter generator and operable to generate one or more operational performance metrics indicative of storage device performance.

16. A storage device as recited in claim 15, wherein the means for adapting the read cache pre-fetch depth further comprises an operational analysis module in operable communication with the operational performance metric generator and the operational parameter generator and operable to adjust the read cache pre-fetch depth in response to variations in the one or more performance metrics and the one or more operational parameters.

17. A processor-readable medium having stored thereon a data structure for mapping address ranges to storage device component latencies, the data structure comprising:

a disk identifier field identifying a disk having a characteristic latency;

an address range field identifying an address range corresponding to the disk identified by the disk identifier; and a latency field having a latency value representing the characteristic latency, such that a read cache pre-fetch depth used in a pre-fetch operation to fetch data in the address range may be adjusted according to the latency value.

18. A processor-readable medium as recited in claim 17 wherein the address range field comprises a logical unit (LUN) and a logical block address (LBA).

19. A processor-readable medium as recited in claim 17 wherein the latency field is dynamically adjusted in response to measurements of the characteristic latency.

20. A processor-readable medium having stored thereon a data structure for mapping address ranges to storage device group latencies, the data structure comprising:

a disk group identifier field identifying a disk group having a characteristic latency;

an address range field identifying an address range corresponding to the disk group identified by the disk group identifier;

one or more disk identifier fields identifying disk drives in the disk group; and a latency field having a latency value representing the characteristic latency, such that a read cache pre-fetch depth used in a pre-fetch operation to fetch data in the address range may be adjusted according to the latency value.

* * * * *

UNITED STATES PATENT AND TRADEMARK OFFICE
CERTIFICATE OF CORRECTION

PATENT NO. : 7,146,467 B2  Page 1 of 1
APPLICATION NO. : 10/414189
DATED : December 5, 2006
INVENTOR(S) : Brian S. Bearden et al.

It is certified that error appears in the above-identified patent and that said Letters Patent is hereby corrected as shown below:

In column 21, line 39, in Claim 5, delete "parameter;" and insert -- parameters; --, therefor.

In column 23, line 21, in Claim 13, delete "store" and insert -- storage --, therefor.

Signed and Sealed this

Twenty-seventh Day of July, 2010

David J. Kappos
*Director of the United States Patent and Trademark Office*